June 29, 1954     C. A. NORGREN     2,682,393
AEROSOL GENERATOR

Filed April 7, 1950     2 Sheets-Sheet 1

*INVENTOR.*
Carl A. Norgren
BY
ATTORNEY

June 29, 1954

C. A. NORGREN 2,682,393

AEROSOL GENERATOR

Filed April 7, 1950

INVENTOR.
Carl A. Norgren
BY

ATTORNEY

Patented June 29, 1954

2,682,393

UNITED STATES PATENT OFFICE 2,682,393

AEROSOL GENERATOR

Carl A. Norgren, Denver, Colo., assignor to C. A. Norgren Co., a corporation of Colorado Application April 7, 1950, Serial No. 154,488

10 Claims. (Cl. 261—78)

My invention is a method and apparatus for generating aerosols and the like, and is particularly adapted for use as an airline lubricator which injects a fog or mist of lubricant into a stream of air under pressure passing through the device.

For several years, pneumatic machinery has been lubricated by injecting atomized oil into an airline supplying compressed air to a tool. The devices for injecting the oil fog into the air stream are known as airline lubricators, and have in the past been considered generally satisfactory for most purposes. Modern high-speed machinery, however, such as air-driven rotors or spindles operating at speeds such as 50,000 R. P. M., demand greatly improved, reliable, and closely controllable lubrication.

My device satisfactorily meets these and other related requirements for the lubrication of high-speed machinery, and is at the same time satisfactory for lubricating ordinary relatively slow-speed pneumatic machines. The fog or mist produced by my device is quite uniform with regard to particle size and does not contain relatively large droplets which may injure rapidly moving parts. In addition, the fog or aerosol produced possesses a high order of stability, as well as excellent wetting qualities, all of which are desirable characteristics and necessary for the lubrication of high-speed machinery.

Accordingly, one of the primary objects of my invention is the provision of a method for generating an aerosol and an aerosol generator adapted to discharge an aerosol of liquid in air into a compressed air line, which is simple in design, efficient in operation, low in cost, durable, and capable of accurate feed regulation.

More specifically, the important objects of my invention include the provision of a device for introducing into a stream of gas under pressure a fog or mist of liquid such as oil, in which relatively large liquid droplets are substantially absent, and in which the droplets are of generally uniform size; which may be easily and accurately regulated, which will operate satisfactorily on either a steady or pulsating air supply; which will properly and uniformly feed even very small quantities of liquid into the air stream; and which is highly resistant to clogging.

Further objects and advantages of my invention will be disclosed in the course of the following detailed description and in the appended drawings, in which.

Figure 1:
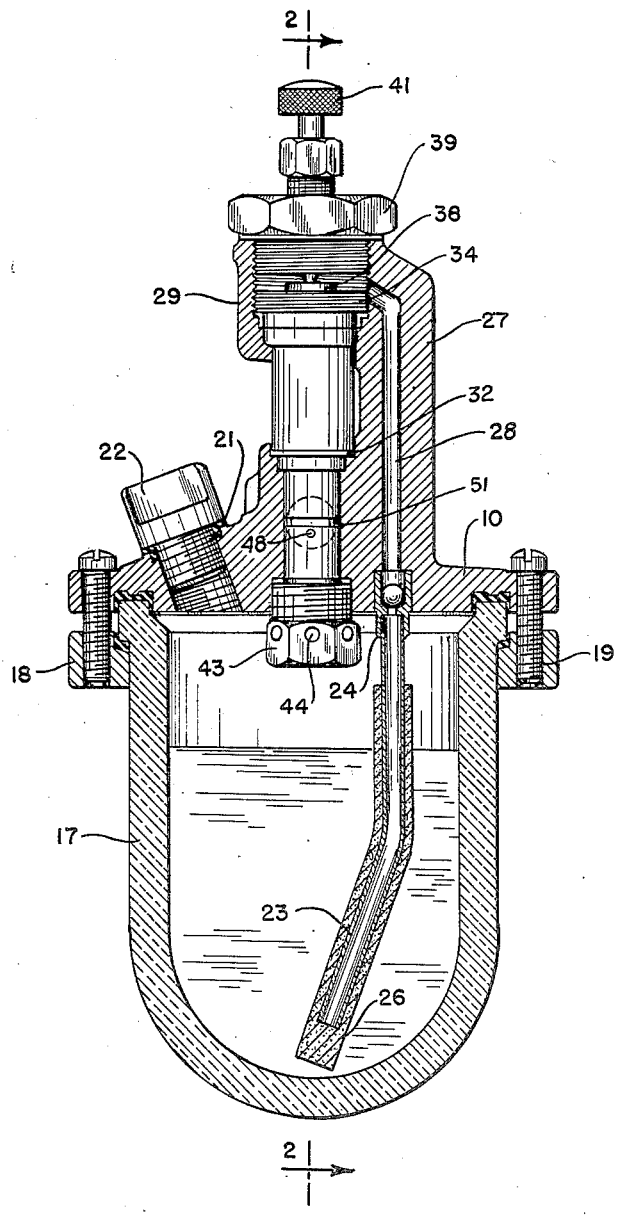
Fig. 1 is a partial vertical section through my device.
Figure 2:
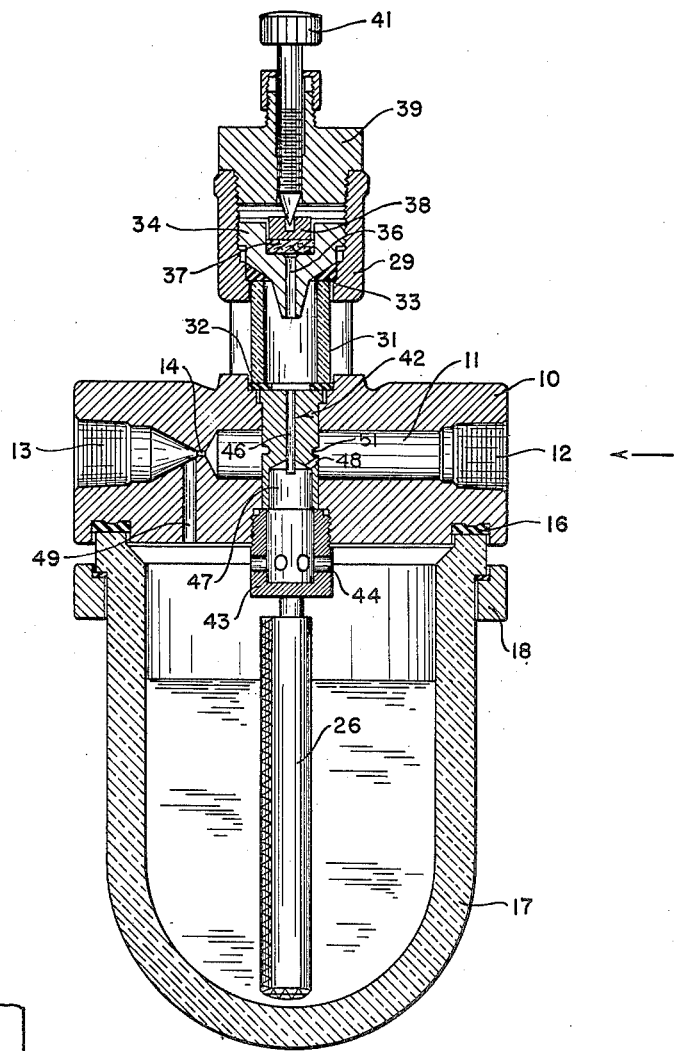
Fig. 2 is a vertical section taken along the line 2—2 of Fig. 1.
Figure 3:
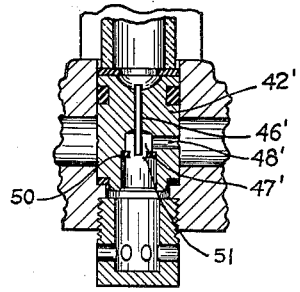
Fig. 3 is a partial section through a modified form of plug.

In general, I accomplish these and other objectives by passing the air stream through a bore formed in a body past a plug and through a restriction interposed between the inlet and outlet of the bore. A liquid reservoir is sealed to the body and is provided with an oil conduit which carries the oil or other liquid to a point above the plug extending through the bore. A metering device in the oil conduit regulates the flow of oil and permits it to drop through a sight-glass into an axially disposed atomizing conduit formed in the plug. The air at inlet pressure, entering the plug through an air conduit which intersects the atomizing conduit, atomizes the liquid, which is discharged into the upper portion of the bowl above the liquid therein. Heavy particles drop from the aerosol and are returned directly to the liquid in the bowl. The portion of the atomized oil which remains suspended in the bowl is drawn outwardly into the air stream through an aerosol conduit which extends from the upper portion of the bowl into communication with the bore at a point immediately downstream from the restriction.

Since only such particles as will remain suspended in a body of air are drawn into the air stream, it is obvious that the maximum particle size is automatically limited. The resulting aerosol is quite stable and will travel through a relatively great length of conduit without forming excessive deposits of oil on the conduit walls. Upon reaching the bearing or other member to be lubricated, the aerosol formed by my device is broken and the droplets deposited upon the surfaces to be lubricated.

Of the total quantity of atomized oil entering the bowl from the atomizing conduit only a small proportion remains suspended in the bowl a sufficient length of time to be drawn into the air stream through the aerosol conduit. The actual percentage so delivered may be varied by changing the size and relationship of the various openings, orifices, and conduits; but when these are fixed, the percentage delivered remains quite constant, regardless of the actual volume of oil permitted to pass through the metering device and sight-glass. In practice, I have found that the parts may be proportioned to deliver to the air stream a quantity of oil in the form of an aerosol equal in weight to about 5 per cent of the weight of oil drawn through the metering device and sight-glass. Thus, the metering device is usually open quite wide, which prevents plugging, and discharges a quantity of oil in the form of drops easily calibrated by visual observation. Despite the large volume of oil apparently fed, only about 1/20 is actually conveyed to the bearing or spindle, and this amount is almost 100 per cent in the form of fog.

As illustrated in the drawings, my device includes a body 10 having a generally cylindrical bore 11 defining an inlet 12 and an outlet 13. Between the inlet 12 and the outlet 13 is a restriction 14 adapted to increase the velocity of air flow and to generate an area of reduced pressure immediately downstream. The lower face of the body 10 is formed to receive a resilient circular gasket 16, against which a lip of a reservoir or bowl 17 is pressed by an external clamping ring 18, in turn secured to the body 10 by bolts 19, or the like. A filling opening, indicated at 21, extends through the body 10 and is normally closed by a suitable plug 22. A liquid conduit tube 23 extends downwardly into the bowl 17 and is secured at its upper end to a check valve 24 suitably mounted in the body 10. The lower portion of the tube 23 and its mouth are surrounded by a filter boot 26. An upwardly extending boss 27 formed integrally with the body 10 is provided with a conduit 28, which extends from the check valve 24 to a head 29 disposed immediately over the bore 11. The head 29 is hollow and of minimum diameter near its lower face to receive a cylindrical transparent sight-glass 31, the lower end of which rests on a gasket 32 positioned in a counterbore in the body 10. The upper lip of the sight-glass 31 is sealed by a gasket 33, the upper surface of which engages a member 34, the lower portion of which is generally conical in shape. The upper external portion of the member 34 is threaded to engage corresponding threads formed within the head 29 and is also provided with an axial bore 36 of relatively small diameter terminating within the sight-glass 31. The upper extremity of the bore 36 is counterbored to receive a pad 37 of porous compressible material such as felt, which extends across the mouth of the bore 36. A pressure block 38 rests on the upper surface of the pad 37 and is somewhat smaller in diameter. The head 29 is closed by a nut 39, which in its closed position defines a space immediately above the upper surface of the member 34 and with which the conduit 28 communicates. An adjusting screw 41 extends through a threaded axial opening in the nut 39 and engages the block 38 in such manner as to selectively increase or decrease the pressure of the block 38 against the felt pad 37.

The body 10 is provided with a transverse, preferably cylindrical, opening intersecting the bore 11 at a point between the inlet 12 and the restriction 14, and extends from a point immediately below the head 29, through the lower face of the body 10 into communication with the upper portion of the bowl 17. A cylindrical plug, generally designated 42, is disposed in this opening and is engaged at its upper extremity by the lower face of the gasket 32. A hollow cup-shaped deflector 43 is threaded into the body immediately below the plug 42 and engages the lower face thereof. The bottom of the deflector 43 is solid, but the walls thereof immediately above the bottom are provided with a plurality of laterally disposed openings 44, which lie wholly below the face of the body 10. The upper portion of the plug 42 is provided with a small axially disposed atomizing tube 46 extending from the upper face of the plug downwardly into a counterbore 47 formed in the lower portion of the plug 42. An air conduit 48 extends angularly inwardly and downwardly from the upstream face of the plug 42 into the counterbore 47 in such position as to atomize liquid discharged from the mouth of the atomizing bore 46. Preferably, the size of the counterbore 47 closely approximates the internal diameter of the cup-shaped deflector 43. An aerosol conduit 49 is also formed in the body and extends from the lower face thereof within the confines of the bowl 17 upwardly to the bore 11, the mouth of the aerosol conduit 49 being disposed immediately downstream from the restriction 14.

Since the diameter of the plug 42 may closely approximate the diameter of the bore 11, I provide a circumferential channel 51 extending around the portion of the plug disposed in the bore 12, thus forming a restricted channel permitting the passage of air from the inlet 12 to the restriction 14. It is not, of course, esential that the portion of the plug disposed in the bore 11 be cylindrical. Other shapes may be utilized provided they define an air passageway around the plug 42.

In operation, a quantity of liquid, usually oil, is placed in the bowl 17, the quantity added being less than that required to completely fill the bowl. Filling plug 22 is then replaced and firmly seated to prevent leakage. Air under pressure is then admitted to a suitable air line connected to the inlet 12 and the outlet 13 of my device. Air inlet pressure passes through the air conduit 48 downwardly through the deflector 43 and openings 44 into the bowl 17, placing the interior of the bowl under pressure approximating inlet pressure. The remainder of the air passes through the channel 51 and through the restriction 14, creating an area of relatively lower pressure immediately downstream from the restriction 14. Thus, the pressure at the upper end of the aerosol conduit 49 is less than the pressure existing within the bowl 17. In addition, the velocity of the air passing through the air conduit 48 creates a relatively low pressure condition in said tube 46, thus drawing oil upwardly through the filter boot 26, the liquid conduit 23, the check valve 24, and the conduit 28, into the head 29. This oil passes through the pad 37 at a rate which varies with the pressure exerted against the pad by the regulating screw 41 and emerges as drops which fall from the mouth of the bore 36 within the sight-glass. These droplets of oil then pass through the atomizing bore 46 and upon discharge into the counterbore 47 are atomized by air entering through the air conduit 48. At this point the aerosol includes some large droplets, and is discharged laterally above the liquid level through the openings 44 into the air space within the bowl 17 above the liquid. In the bowl, the large particles settle and are returned automatically to the body of the liquid in the bowl 17. The remainder of the aerosol is drawn outwardly through the aerosol conduit 49 and discharged through the outlet 13. It should be particularly noted that the openings 44 are disposed above the liquid level in the bowl 17, but below the lower face of the body 10, thus preventing liquid from being carried across the lower face of the body 10 and into the aerosol conduit 49.

The openings 14, 51, and 48, the conduits 46, 44, 48, and 49 being fixed as to size a practically constant and relatively large percentage of the oil passing through the glass 31 will settle out of suspension in the bowl 17. For most purposes, the dimensions of the parts may be adjusted in such manner that this percentage is about 95, but in special instances may be greater or less. Since only a fraction of the oil passing through the glass 31 finds its way into the air stream, the regulating valve may be open much wider than would otherwise be permissible, thus avoiding the danger of plugging.

By way of illustration, if it is desired to add say one drop of oil per minute to the air stream, and the lubricator is constructed as indicated to pass only 5 per cent of the oil drawn through the sight-glass 31 into the air stream, the screw 41 is adjusted to pass 20 drops of oil per minute through the glass 31. Because of the relatively large number of drops per minute, accurate visual regulation is easily attained and the need for readjustment largely eliminated. It will also be noted, particularly by comparison with conventional lubrications, that it is virtually impossible to introduce unatomized oil into the air stream.

The quantity of air entering through the air conduit 48 may be regulated by varying the size of conduit, or in some instances by turning the plug 42 in such manner as to dispose the axis of the conduit 48 at an angle to the axis of the bore 11. This changes the quantity of air drawn inwardly into the bowl 17 and therefore also regulates the quantity of oil drawn upwardly through the boss 27 and into the atomizing tube 46. Since the liquid in the conduit 28 is trapped by the check valve 24, it is obvious that lubrication will be attained almost immediately upon the initiation of air through the bore 11, thus insuring that the machinery driven by the air stream will not be without adequate lubrication at any time.

It will be apparent from the foregoing explanation that the operation of my device may be modified as necessary by varying the size of the restriction 14 and the diameter of the air conduit 48. Furthermore, as is frequently desirable, the pressure-reducing effect of the air passing through the conduit 48 may be enhanced by employing a modified arrangement of parts, such as that shown in Fig. 3.

In this form, a plug 42′, generally similar to plug 42 in position and exterior configuration, is provided with an axial atomizing tube 46′, the lower discharge end of which is within a counterbore 47′. An air conduit 48′ extends horizontally into the counterbore 47′ from the upstream face of the plug 42′ above the lower end of the tube 46′. A baffle 50 having an axial bore 51 is seated in the counterbore below the outlet of the air conduit 48′ and at or near the level of the end of the tube 46′. Since the bore 51 is somewhat larger than the external diameter of the tube 46′, air at approximately inlet pressure will be forced downwardly through the bore 51 past the end of the tube 46′ at a high velocity, thereby creating a reduced pressure in the tube 46′, which in turn draws liquid from the reservoir 17.

By comparison with the form shown in Figs. 1 and 2, it may be seen that the form shown in Fig. 3 provides for a greater velocity of air passing downwardly past the end of the tube 46′, thus creating a greater pressure reduction. In addition, the effect may be increased or decreased by simply substituting baffles 50 having openings 51 of smaller or larger diameter.

The foregoing detailed description has been made in compliance with R. S. 4888, and is intended to illustrate a preferred embodiment of my invention but not to restrict the scope thereof to the precise form shown. I do not therefore specifically limit myself to the details herein described, except insofar as defined in the appended claims.

I claim:

1. An aerosol generator for airlines and the like comprising a body having a bore for the passage of air under pressure and defining successively an inlet, a restriction, and an outlet; a liquid reservoir sealed to the body; a plug extending transversely through the body and the bore between the inlet and the restriction, said plug defining a restricted passage for air flowing under pressure through the bore; and an axial conduit discharging into the upper portion of the reservoir above the level of liquid therein; a liquid conduit extending from within the reservoir upwardly to a point above said axial conduit and in sealed communication therewith; said plug having an air conduit extending inwardly from the upstream face of the plug and intersecting the axial conduit for atomizing liquid passing therethrough; and an aerosol conduit extending from the upper portion of the reservoir into the bore at a point immediately downstream from said restriction.

2. An aerosol generator for compressed airlines and the like comprising a body having an upwardly extending stem and a bore below the upper end of the stem defining successively an inlet, a restricted portion, and an outlet; a liquid reservoir sealed to the lower face of the body, a liquid conduit extending from the lower portion of the reservoir upwardly through the stem; valve means for regulating the flow of liquid through said liquid conduit, a plug below the upper end of the stem extending through the bore and defining a restricted passageway therewith for the passage of air from the inlet to the restricted portion of the bore, said plug having an axial conduit formed therein for receiving liquid from the liquid conduit; a counterbore communicating with the outlet of the axial conduit; and an air conduit extending from the upstream face of the plug into the counterbore for atomizing liquid passing from the axial conduit; a gauge glass sealed between the stem and the body for conveying liquid from the liquid conduit to the axial conduit; a cup-shaped deflector on the body in the reservoir communicating with the counterbore in the plug and having a plurality of laterally extending discharge openings formed in its walls, said openings being disposed below the body and above the level of liquid in the reservoir; conduit means having an inlet at the lower face of the body within the reservoir; and an outlet in the bore immediately downstream from said restricted portion.

3. An aerosol generator for air lines and the like comprising a body having a bore for passage of air under pressure and defining successively an inlet, a restriction, and an outlet, a liquid reservoir sealed to the body, a plug extending transversely through the body and the bore between the inlet and the restriction, said plug defining a restricted passage for air flowing under pressure through the bore, a counterbore in the plug opening into the reservoir above the level of liquid therein, an axial tube extending downwardly through the plug in the counterbore, a baffle in the counterbore having a central opening near the discharge end of the tube and air conduit extending from the upstream face of the plug into the counterbore above the baffle and discharge end of the tube, a liquid conduit extending from within the reservoir upwardly to a point above the axial tube, a transparent sight-glass sealing the liquid conduit to the axial tube, and an aerosol conduit in the body extending from the upper portion of the reservoir above the level of liquid therein into the bore at a point immediately downstream from said restriction.

4. An aerosol generator for compressed air line and the like comprising a body providing a main air flow channel defining successively an inlet portion, a channel area decreasing restriction and an outlet portion of open cross-sectional area greater than the area of the opening through said restriction, structure providing a settling chamber of greater volumetric capacity than said air flow channel, means interconnecting the inlet portion of said air flow channel and the interior of said settling chamber structure, said means having a by-pass passage therethrough for conducting bleed air from said inlet portion into the interior of the settling chamber structure, a liquid reservoir, a liquid conduit interconnecting said reservoir and settling chamber for delivering the liquid into said chamber for discharge at a point adjacent the by-pass bleed air outlet for atomizing said liquid, and said air flow channel having a passage therethrough interconnecting said settling chamber structure and the channel through said body at a point adjacent the downstream side of said restriction, the relatively reduced pressure at said side of said restriction being effective to withdraw atomized liquid particles from said settling chamber into the airstream before emission of said air from the aerosol generator.

5. The method for forming an aerosol fog of liquid in an airstream which comprises maintaining a flow of air at superatmospheric pressure through at least two zones maintained at different pressures, bleeding off a portion of the air flow from the zone of greatest pressure for atomizing a liquid in a zone of equivalent pressure but removed from said first-named zone wherein the major portion of the atomized liquid is allowed to settle and return to the liquid state, and removing the remaining minor portion of the atomized liquid from said settling zone for introduction into the first-named zone of lesser absolute pressure, said removal being a natural function of the differential pressures existing between said settling zone and the first-named zone of lesser pressure.

6. The method for forming above a body of liquid an aerosol fog of liquid in an air stream which comprises maintaining a flow of air at super-atmospheric pressure through at least two zones in said air stream and maintained at different pressures, feeding liquid a small portion of which is to be atomized from said feed liquid to a third zone removed from said first two named zones and wherein the major portion of feed liquid is caused to return to said body, by-passing and regulating a portion of the air flow from the zone of greatest pressure to said third zone wherein a portion of the atomized liquid is allowed to settle and return to the liquid state and to said body of liquid, and causing said remaining atomized liquid to pass from above said body of liquid for introduction into said first named zone of lesser pressure by the differential pressures existing therein and above said body of liquid.

7. The method specified in claim 6 and wherein the by-passing of the air is regulatable for varying the velocity thereof and for controlling the quantity of liquid fed to said third zone.

8. An aerosol generator for airlines and the like comprising a body having a bore for the passage of air under pressure and defining successively an inlet, a restriction, and an outlet; a liquid reservoir sealed to said body; interceptor means interposed in the inlet portion of said bore and communicating with said liquid reservoir and adapted to intercept part of air under pressure through said bore and restriction, means for feeding liquid to said interceptor, a by-pass passage in said interceptor for conducting bleed air from said inlet portion of said bore to said interceptor for atomizing liquid therein and causing it to enter said reservoir, and an aerosol outlet passage from said reservoir and communicating with the outlet portion of said bore on the downstream side of said restriction of said bore.

9. The structure recited in claim 8 and in which said interceptor means is movable to change position of said by-pass passage relative to said bore to vary the velocity of air being by-passed and to vary the rate of atomization of liquid feed to the interceptor.

10. The structure recited in claim 8 and wherein said interceptor means is in the form of a rotary plug extending transversely of said bore and having its periphery spaced from the walls of said bore, said plug having an atomizing chamber communicating with said reservoir and a liquid feed tube extending into said chamber, and said plug having an air by-pass duct extending from said chamber into said bore upstream of said restriction.

References Cited in the file of this patent

UNITED STATES PATENTS

| Number | Name | Date |
|---|---|---|
| 788,757 | Deeks | May 2, 1905 |
| 1,568,840 | Holmes | Jan. 5, 1926 |
| 1,863,192 | Doble | June 14, 1932 |
| 2,223,700 | Norgren | Dec. 3, 1940 |
| 2,437,526 | Heidbrink et al. | Mar. 9, 1948 |
| 2,613,067 | Goodyer | Oct. 7, 1952 |